United States Patent
Bradley

(10) Patent No.: US 9,969,883 B2
(45) Date of Patent: May 15, 2018

(54) POLYAMIDE COMPOSITION WITH LOW THERMAL CONDUCTIVITY

(75) Inventor: Gerard Bradley, Brindas (FR)

(73) Assignee: Rhodia Operations, Aubervilliers (FR)

( * ) Notice: Subject to any disclaimer, the term of this patent is extended or adjusted under 35 U.S.C. 154(b) by 752 days.

(21) Appl. No.: 13/516,582

(22) PCT Filed: Dec. 16, 2010

(86) PCT No.: PCT/EP2010/069867
§ 371 (c)(1),
(2), (4) Date: Jul. 17, 2012

(87) PCT Pub. No.: WO2011/073305
PCT Pub. Date: Jun. 23, 2011

(65) Prior Publication Data
US 2012/0316261 A1 Dec. 13, 2012

(30) Foreign Application Priority Data

Dec. 16, 2009 (FR) ..................................... 09 59041

(51) Int. Cl.
| | | |
|---|---|---|
| *C08L 77/02* | (2006.01) | |
| *C08L 77/06* | (2006.01) | |
| *C08K 7/20* | (2006.01) | |
| *C08K 7/28* | (2006.01) | |
| *C08L 55/02* | (2006.01) | |

(52) U.S. Cl.
CPC ............... *C08L 77/06* (2013.01); *C08L 77/02* (2013.01); *C08K 7/20* (2013.01); *C08K 7/28* (2013.01); *C08L 55/02* (2013.01); *C08L 2205/02* (2013.01); *C08L 2205/035* (2013.01); *C08L 2205/08* (2013.01)

(58) Field of Classification Search
CPC .......... C08L 77/02; C08L 77/06; C08L 55/02; C08K 7/20; C08K 7/28
See application file for complete search history.

(56) References Cited

U.S. PATENT DOCUMENTS

| | | |
|---|---|---|
| 5,158,986 A | 10/1992 | Cha et al. |
| 5,495,546 A | 2/1996 | Bottoms, Jr. et al. |
| 5,959,069 A | 9/1999 | Gluck et al. |
| 5,990,244 A * | 11/1999 | Warakomski et al. ....... 525/179 |
| 6,525,166 B1 | 2/2003 | Di Silvestro et al. |
| 2002/0115771 A1* | 8/2002 | Schueler et al. .............. 524/394 |
| 2004/0048981 A1 | 3/2004 | Park |
| 2008/0176999 A1* | 7/2008 | Tamai et al. .................... 525/63 |
| 2009/0242382 A1 | 10/2009 | Lipinska-Kalita et al. |

FOREIGN PATENT DOCUMENTS

| | | |
|---|---|---|
| CN | 101092501 A | 6/2007 |
| EP | 0682057 A1 | 11/1995 |
| EP | 0632703 B1 | 2/1999 |
| EP | 0832149 B1 | 7/2000 |
| FR | 2743077 A1 | 7/1997 |
| FR | 2779730 A1 | 12/1999 |
| JP | 5-171032 A | 7/1993 |
| JP | 05171032 A * | 7/1993 |
| KR | 10-0529206 A | 11/2005 |
| WO | 2008/140196 A1 | 11/2008 |

OTHER PUBLICATIONS

Rhodia Polyamide, "Technyl Alloy for Improved Surface Finish," Oct. 2007, Found at: http://www.rhodia.com/en/binaries/polyamide_brochure_technyl_alloy_EN.pdf, Accessed: Mar. 26, 2010
3M Energy and Advance Materials Division, "3M™ Glass Bubble K Series S Series," Found at: http://multimedia.3m.com/mws/mediawebserver?TTTTTVv-LdGtMYu7QYOTOZ9Tfwvrfdv-IwUTfwUTfTTTTTT, Accessed: Mar. 26, 2010.
International Search Report dated Apr. 19, 2011 by the European Patent Office as the International Search Authority in corresponding International Patent Application No. PCT/EP2010/069867, and an English language translation of the Search Report.
Non-machine English language translation of Japanese patent JP 05-171032, including translator's report, as provided by RWS Group.

\* cited by examiner

Primary Examiner — Peter D. Mulcahy
(74) Attorney, Agent, or Firm — Osha Liang LLP

(57) ABSTRACT

A polyamide composition that can be used in different transformation methods and, in particular, for the production of an extrusion profile having a low thermal conductivity, is described. One such composition includes, in particular, glass beads. Also described is a composition, preferably a molding composition, e.g., in the form of granules or powder, that can be used to produce items by means of injection molding.

18 Claims, No Drawings

POLYAMIDE COMPOSITION WITH LOW THERMAL CONDUCTIVITY

CROSS-REFERENCE TO PRIOR APPLICATIONS

This application is a National Stage of PCT/EP2010/069867, filed Dec. 16, 2010, and designating the United States (published in French on Jun. 23, 2011, as WO 2011/073305 A1; the title and abstract were published in English), which claims priority of FR 0959041, filed Dec. 16, 2009, each hereby expressly incorporated by reference in its entirety and each assigned to the assignee hereof.

The present invention relates to a polyamide composition that can be used in various methods of processing and notably for the manufacture of extruded profiles having low thermal conductivity. Said composition notably comprises glass beads. The composition is preferably a molding compound, for example in the form of granules or powder, to be used for making articles by an injection molding process.

PRIOR ART

Engineering polyamides are used for making numerous articles in various fields, such as the automobile industry, where specific properties of rigidity, impact toughness, dimensional stability, in particular at a relatively high temperature, surface finish, density and weight are particularly sought after. The choice of a material for a given application is generally guided by the performance level required with respect to certain properties and by its cost. In fact there is always a demand for new materials that meet particular specifications in terms of performance and/or cost.

For making certain plastic articles such as door and window frames there is a need for material that has low thermal conductivity, without any drastic decrease in the other properties of the polyamide such as notably the mechanical properties and ease of application.

INVENTION

The applicant discovered, quite surprisingly, that the use of glass beads with certain thermoplastic polymers in a polyamide composition made it possible to obtain a marked reduction in thermal conductivity and thus avoid, for certain applications, heat loss through establishment of a thermal bridge. Moreover, the compositions of the invention offer a very good compromise between reduction of thermal conductivity and the heat-distortion temperature (HDT). This composition also has the advantage of reduced moisture absorption and a decrease in density relative to the conventional polyamide formulations.

The present invention thus relates to a thermoplastic composition comprising at least the following compounds:
Compound A: thermoplastic polyamide,
Compound B: thermoplastic polymer having a lower thermal conductivity than polyamide A,
Compound C: optionally one or more compatibilizers between compound A and compound B, at least one of which comprises functional groups for compatibilization with compound A,
Compound D: hollow glass beads, and
Compound E: optionally reinforcing fillers or extenders.

The thermal conductivity of this composition, expressed in W/m·k, is preferably less than $0.272X^2+0.088X+CtM$, in which:

X is the proportion by weight of reinforcing fillers or extenders E) present in the composition and
CtM is the thermal conductivity of the matrix M comprising polyamide A, polymer B and compound C, in the absence of any fillers, notably compounds D and E.

X is preferably between 0.1 and 60%, relative to the total weight of the composition, more preferably between 15 and 50%.

The thermal conductivity is notably measured on the dry product (dry as molded) according to standard ASTM-1114-98. Conditioning of the articles for measurement of thermal conductivity can be carried out according to standard ISO 291:2008 with a temperature of 23° C. and a relative humidity of 50% for a duration of 100 h.

As an example, a polyamide composition according to the present invention comprising polyamide 66, said polyamide 66 having a thermal conductivity of 0.3 W/m·k, and 25 wt. % of glass fibers, reinforcing fillers or extenders E), will have a thermal conductivity below $0.272\times(0.25)^2+0.088\times 0.25+0.3$, i.e. below 0.339 W/m·k.

The composition is preferably a composition for molding or extrusion, for example in the form of granules or powder, to be used for making articles by an injection molding or extrusion process.

Compounds A and B can be miscible or immiscible. The composition according to the invention preferably has a continuous phase of polyamide, compound A, in which nodules comprising compound B are dispersed. For this purpose the composition advantageously comprises more of polyamide A than of compound B. Dispersion of compound B in the polyamide is facilitated by the presence of functional groups for compatibilization with the polyamide. These functional groups can be carried by compound B, or by a compatibilizer, generally miscible with compound B. Compatibilization makes it possible to improve the behavior of the compositions.

Compound A

Compound A is thermoplastic polyamide. It can be a single polyamide or a blend of several polyamides. In the latter case, the blend can either be obtained by an operation preceding the preparation of the composition, or can be obtained during preparation of the composition by simultaneous or successive application of the various polyamides.

The polyamide can notably be selected from polyamides such as those obtained starting from lactams and/or amino acids, polyamides such as those obtained starting from diacids and diamines, or the copolyamides of these two types of polyamides.

The polyamides selected from polyamide 6, polyamide 11, polyamide 12, polyamide 4.6, polyamide 6.6, polyamide 6.10, polyamide 6.36, copolyamides 6/6.6 and 6/6.36, and blends and copolymers based on these polyamides and copolyamides, are quite particularly preferred.

Compound A is advantageously based on polyamide 6.6. It can be polyamide 6.6 alone or a blend of polyamide 6.6 and polyamide 6. In the context of this blend, the proportion by weight of polyamide 6 relative to the total weight of the polyamide is preferably between 1 and 30%.

The compositions based on polyamide 6.6 have excellent mechanical properties and excellent properties of heat resistance, and high hardness.

The presence of polyamide 6 with polyamide 6.6 can notably make it possible to reduce shrinkage after forming, improve compatibilization between the polyamide and compound B and therefore improve certain mechanical properties.

The polyamide can optionally have more amine end groups than acid end groups. This characteristic improves the compatibilization, the mechanical properties and/or the surface finish of articles made from the composition.

The composition of the invention can also comprise the copolyamides derived notably from the above polyamides, or the blends of these polyamides or copolyamides.

Generally, polyamides are used that have molecular weights appropriate to the different processes employed.

The modified polyamide can notably be a polymer comprising star or H, branching, branched, hyperbranched macromolecular chains, and if applicable, linear macromolecular chains. Polymers comprising these star or H macromolecular chains are described for example in documents FR2743077, FR2779730, U.S. Pat. No. 5,959,069, EP0632703, EP0682057 and EP0832149.

The modified polyamide can be a polymer of the random tree type, preferably a copolyamide having a random tree structure. These copolyamides with a random tree structure, and the method of production thereof, are notably described in document WO99/03909. The matrix of the invention can also be a composition comprising a linear thermoplastic polymer and a star, H and/or tree thermoplastic polymer as described above. The matrix of the invention can also comprise a hyperbranched copolyamide such as those described in document WO 00/68298. The composition of the invention can also comprise any combination of linear, star, H, tree thermoplastic polymer, hyperbranched copolyamide as described above.

The composition according to the invention preferably has from 30 to 95 wt. % of polyamide, preferably from 40 to 80 wt. %, relative to the total weight of the composition.

The composition can also comprise, depending on the desired final properties, a modified polyamide blend according to the invention and one or more other polymers, for example polyester, polyolefins, polystyrene, polycarbonate, polyphenylene sulfide, polyphenylene oxide, polyacetal, polysulfone, polyether sulfone, polyether imide, polyether ketone, a polylactic acid resin, a polysulfone resin, an elastomeric resin or mixtures thereof.

Compound B

Compound B is notably selected from the group comprising: the styrene (co)polymers, and the polyolefins.

Compound B is preferably a styrene (co)polymer, such as notably acrylonitrile-butadiene-styrene (ABS), acrylonitrile-styrene-butyl acrylate (ASA), styrene-acrylonitrile (SAN), styrene-ethylene-butadiene-styrene (SEBS) or styrene-butadiene-styrene (SBS). The styrene (co)polymer can comprise a rubber on which acrylonitrile and a styrene compound, notably selected from styrene and α-methylstyrene, are grafted. In addition it can bear functional groups intended to improve its compatibility with the polyamide. The copolymer preferably comprises between 10 and 90 wt. % of rubber. The rubber content of the whole of compound B is preferably from 10 to 35 wt. %.

The rubber is preferably selected from the group comprising: polybutadiene, butadiene-styrene rubber, butadiene-acrylate rubber, butadiene-acrylonitrile rubber, ethylene-propylene rubber (EPR) and ethylene-propylene-diene rubber (EPDM) or mixtures of two or more of these rubbers.

Compound B can be prepared in the usual way, for example by grafting monomers of the styrene compound and of acrylonitrile on the rubber. This can be carried out by bulk, solution or suspension polymerization. It is also possible to combine two or more of these methods of polymerization, for example to carry out bulk solution polymerization, bulk suspension polymerization or emulsion-suspension polymerization. Polymerization is preferably carried out in the presence of usual substances, such as free radical donors, optionally in combination with a redox system, chain length regulators, stabilizers, suspending agents, emulsifiers and the like.

Compound B is advantageously an acrylonitrile-butadiene-styrene (ABS) copolymer, if necessary comprising functions for compatibilization with the polyamide. The content by weight of butadiene in this compound is for example between 15 and 35%, the content by weight of styrene relative to the weight of styrene and acrylonitrile is preferably between 20 and 80%, preferably above 50%. It can for example be an acrylonitrile-butadiene-styrene copolymer whose proportions of acrylonitrile, butadiene and styrene are about 25%, 25% and 50% respectively.

According to a particular embodiment, compound B comprises functional groups for compatibilization with the polyamide. These groups are advantageously selected from maleic anhydride, carboxylic acid, and ester groups. Such groups are obtained for example by using a comonomer during preparation of compound B, for example maleic anhydride or acrylamide.

The composition preferably comprises from 0.1 to 30 wt. % of compound B, preferably from 1 to 20 wt. %, relative to the total weight of the composition.

Preferably, compound B has thermal conductivity less than or equal to 0.2 W/m·k.

Compound C

Preferably, but not necessarily, the composition of the invention has at least one compatibilizer between compound A and compound B, comprising at least functional group for compatibilization with compound A.

The functional groups for compatibilization present in at least one of the agents can be of the same nature as those optionally present in compound B. They are advantageously selected from the maleic anhydride, carboxylic acid, and ester groups. These groups are derived from a comonomer used during preparation of compound C, for example maleic anhydride.

When there are several agents, the mixture can either be obtained by an operation preceding the preparation of the composition, or can be obtained during preparation of the composition by simultaneous or successive application of different compatibilizers.

According to the embodiment for which compound B comprises groups for compatibilization with the polyamide, advantageously the compositions do not comprise compound C.

As compatibilizers, we may mention styrene-maleimide copolymers grafted with functional groups selected from carboxylic acids and anhydrides. Styrene-maleimide copolymer means a polymer having units derived from styrene and maleimide units of formula (I):

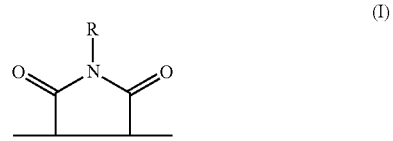

in which R is selected from hydrogen, alkyl radicals, aromatic or aryl-aromatic radicals. R is for example a phenyl group. The maleimide unit can for example be selected from N-phenyl maleimide, N-(o-methylphenyl maleimide), N-(m-methylphenyl maleimide), N-(p-methylphenyl maleimide). These copolymers can for example be obtained by copolymerization of styrene and of maleic anhydride and then partial reaction with an amine, for example aniline, to form maleimide units from anhydride units. The anhydride units that have not reacted with the amine constitute the functionalization. Another method consists of copolymerizing styrene, maleimide and maleic anhydride directly.

The maleic-anhydride-grafted styrene-maleimide copolymers (SMI-g-MA), notably those whose proportions by weight of the various units are between 40 and 60% of styrene units, between 40 and 60% of N-phenyl maleimide units, and between 0.1 and 5% of maleic anhydride units are quite particularly preferred as compatibilizer. These copolymers have particularly high mechanical and thermal properties, so that the compositions have particularly good performance, in particular with respect to properties evaluated at relatively high temperatures.

The composition can also comprise a nongrafted styrene-maleimide copolymer.

As compatibilizer, we may also mention styrene-ethylene-butadiene-styrene or styrene-butadiene-styrene block copolymers, if necessary fully or partially hydrogenated, having functional groups for compatibilization with the polyamide, for example maleic anhydride functional groups. Such compounds are known by a person skilled in the art. Copolymers of this type are marketed for example by the company Shell as the Kraton range. We may mention more particularly the styrene-ethylene-butylene-styrene copolymer modified with maleic anhydride (SEBS-g-MA).

The proportion by weight of this agent in the composition is advantageously between 0.5 and 10%. It is preferably less than 5%.

Advantageously, both maleic-anhydride-grafted styrene-maleimide and maleic-anhydride-grafted SEBS can be used as compatibilizers.

A maleic-anhydride-grafted styrene-acrylonitrile copolymer, or even maleic anhydride introduced directly during preparation of the composition, can also be used as compatibilizer.

Compound D

Compounds D are hollow glass beads. These glass beads are well known and notably are mentioned in Plastics Additives Handbook, Hanser, 4th edition, pages 537-538.

The hollow glass beads generally have an average diameter between 1 µm and 2 mm, preferably between 10 and 500 µm, more preferably between 5 and 250 µm. The hollow glass beads generally have a density below 1 g/cm$^3$, notably between 0.2 and 0.6 g/cm$^3$.

The preferred glass beads of the invention are those having sufficient resistance to bursting when they are used in manufacturing processes, such as extrusion or injection molding, in the composition according to the invention, so as to endow said composition with a decrease in density of at least 0.4% for each 1 wt. % of glass beads added to said composition. The density can be measured according to standard ISO 1183.

The preferred aim is to use hollow glass beads to give a decrease of at least 5% of the total weight of the composition.

The polyamide composition generally comprises from 5 to 30 wt. % of glass beads, preferably from 10 to 20 wt. %, relative to the total weight of the composition.

The glass beads can comprise a coating, such as notably a silane coating.

Compound E

The composition can optionally comprise reinforcing fillers or extenders, notably fibrous or nonfibrous.

The reinforcing fillers or extenders according to the present invention can be for example fibrous fillers and/or nonfibrous fillers.

As fibrous fillers, we may mention glass fibers, carbon fibers, natural fibers, aramid fibers, and nanotubes, notably of carbon. Hemp and flax may be mentioned as natural fibers. Among nonfibrous fillers we may notably mention all particulate, lamellar fillers and/or exfoliable or nonexfoliable nanofillers such as alumina, carbon black, aluminosilicate clays, montmorillonites, zirconium phosphate, kaolin, calcium carbonate, diatoms, graphite, mica, silica, titanium dioxide, zeolites, talc, wollastonite and polymer fillers such as, for example, particles of dimethacrylates.

Inorganic fillers are particularly preferred.

It is perfectly possible according to the invention for the composition to comprise several types of reinforcing fillers. Preferably, the filler used most can be glass fibers, of the chopped type, notably having a diameter between 7 and 14 µm. These glass fibers can have an average length between 200 and 400 µm. These fillers can have surface sizing that ensures mechanical adhesion between the fibers and the polyamide matrix.

The concentration by weight of the reinforcing fillers or extenders is advantageously between 1 and 60 wt. % relative to the total weight of the composition, preferably between 15 and 50 wt. %.

The composition according to the invention can moreover comprise additives that are used conventionally in the manufacture of polyamide compositions. Thus, we may mention lubricants, fireproofing agents, plasticizers, nucleating agents, impact modifiers, catalysts, light and/or thermal stabilizers, antioxidants, antistatics, dyes, matting agents, molding aids or other conventional additives.

Impact modifiers may notably be added to the polyamide composition. In general, polymers of elastomers can be used for this purpose. Examples of suitable elastomers are ethylene-acrylic ester-maleic anhydride, ethylene-propylene-maleic anhydride, EPDM (ethylene-propylene-diene monomer) optionally with a grafted maleic anhydride. The concentration by weight of elastomer is advantageously between 0.1 and 30% relative to the total weight of the composition.

Notably, impact modifiers are preferred that comprise functional groups that are reactive with the polyamide. We may mention for example terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene-maleimide copolymers grafted with maleic anhydride, styrene-ethylene-butylene-styrene copolymers modified with maleic anhydride, styrene-acrylonitrile copolymer grafted with maleic anhydrides, acrylonitrile-butadiene-styrene copolymers grafted with maleic anhydrides, and hydrogenated versions thereof. The proportion by weight of these agents in the total composition is notably between 0.1 and 40%.

These fillers and additives can be added to the modified polyamide by usual means appropriate to each filler or additive, for example during polymerization or by mixing in the melt.

The materials of the invention are generally obtained by hot mixing of the various constituents, for example in a single-screw or twin-screw extruder, at a temperature sufficient to maintain the polyamide resin in the molten state; or cold, notably in a mechanical mixer. The composition is preferably prepared by mixing the materials in the molten state.

Generally, the mixture obtained is extruded in the form of rods, which are chopped up to form granules. The compounds can be added at any moment of the process for manufacture of the plastic material, notably by hot or cold mixing with the plastic matrix. The addition of the compounds and additives can be effected by adding these compounds in the molten plastic matrix in pure form or in the form of a concentrated mixture in a matrix, for example a plastic matrix.

The composition according to the invention can be used for any forming process for plastics, for the manufacture of articles; for example molding processes, notably injection molding, or extrusion, such as extrusion blow molding.

It is perfectly possible to use processes for forming polyamide foam, notably those using chemical agents or physical agents such as a supercritical fluid (SCF), notably during a forming process, such as extrusion or injection molding. Such a process is generally known as FIM, for foam injection molding. We may mention in this connection the various considerations in U.S. Pat. No. 5,158,986. This makes it possible to obtain a microcellular article, notably called foam.

The invention thus also relates to a microcellular polyamide article obtained by forming the composition according to the invention. These articles, also called foams, can be structural foams or nonstructural foams. The structural foams are rigid foams composed of a core of low density and a skin with a density close to that of the polymer making up the matrix. These foams can be used as lightweight structures in the field of aeronautics or automobiles for example. The nonstructural foams can be flexible or rigid. The rigid foams are used in the field of thermal insulation; the gas present in the cells acts as an insulator. Flexible foams are used in the field of furniture and upholstery, for their properties of compressibility and cushioning, in the field of packaging on account of their light weight, and in the field of sound insulation; foams with open porosity have the special feature that they absorb certain frequencies.

The use of the compositions according to the invention is particularly interesting in the context of the manufacture of articles for the automobile and electrical industries, and in building.

The present invention notably relates to extruded profiles based on the composition according to the invention. These profiles are notably used for window and door frames. For example, they can be used for sealing between the glass panes and metal frames, notably of aluminum. These profiles can for example be placed or molded into these frames. These profiles can notably be foams, as explained above.

The invention thus also relates to windows and doors whose frame comprises extruded profiles based on the composition according to the invention.

The present invention thus also relates to an injection molding process in which a composition according to the invention is fed into an injection molding machine, notably in the form of granules, and molding is carried out.

Specific terminology is used in the description so as to facilitate understanding of the principle of the invention. However, it must be understood that no limitation of the scope of the invention is intended by the use of this specific terminology. Modifications and improvements can notably be envisaged by a person skilled in the art, based on his own general knowledge.

The term "and/or" includes the meanings and, or, as well as all other possible combinations of the elements connected with this term.

Other details or advantages of the invention will become clearer from the following examples, which are purely for purposes of illustration.

EXPERIMENTAL SECTION

Characterizations

Example 1: Preparation of the Formulations

Formulations of polyamide 66 (PA 66 A27 00 from Rhodia) and various proportions of ABS (Terulan H1-10), of compatibilizer (SMI-g-MA), polyamide 6 (PA6 S27), hollow glass beads (3M im30K), glass fibers (Vetrotex FV983 10 μm) and 1% of conventional additives, in a Werner & Pfleiderer ZSK 40 twin-screw extruder at a screw speed of 230 rpm with the following temperature profile in degrees Celsius: Zone 1: 250; Zone 2: 260; Zone 3: 260; Zone 4: 260; Zone 5: 270; Zone 6: 270; Zone 7: 270; Zone 8: 280. The rods leaving the extruder go into a water-cooling tank and are then granulated.

These formulations were tested and the results are presented in Table 1 below:

TABLE 1

| (%) | C1 | C2 | C3 | C4 | C5 | C6 | 1 |
| --- | --- | --- | --- | --- | --- | --- | --- |
| PA66 | 74 | 58 | 56 | 47 | 50.5 | 39 | 40 |
| ABS | — | — | — | — | 10 | 20 | 10 |
| Compatibilizer | — | — | — | — | 3.5 | 5 | 4 |
| PA6 | — | 6 | 6 | 6 | 10 | 10 | 10 |
| Glass beads | — | 10 | 12 | 21 | — | — | 10 |
| Glass fibers | 25 | 25 | 25 | 25 | 25 | 25 | 25 |
| Elongation at rupture ISO 527 (MPa) | 167 | 126 | 126 | 115 | 149 | 136 | 145 |
| Tensile modulus ISO 527 (MPa) | 8010 | 9020 | 8920 | 9600 | 8690 | 8280 | 9290 |
| Density ISO 1183 (g/cm$^3$) | 1.31 | 1.20 | 1.14 | 1.1 | 1.3 | 1.28 | 1.24 |
| Density reduction (%) | — | 8 | 13 | 16 | — | — | 5.3 |
| Density reduction per % of glass beads | — | 0.8 | 1 | 0.8 | — | — | 0.53 |

TABLE 1-continued

| (%) | C1 | C2 | C3 | C4 | C5 | C6 | 1 |
|---|---|---|---|---|---|---|---|
| HDT 1.8 MPa (° C.) | 247 | 250 | 250 | 250 | 235 | 210 | 235 |
| Thermal conductivity (W/m · K) | 0.339 | 0.312 | 0.295 | 0.28 | 0.280 | 0.26 | 0.270 |

The percentages are expressed as a percentage relative to the total weight of the composition The thermal conductivity is measured according to standard ASTM-1114-98 on a specimen conditioned according to standard ISO 291:2008 with a temperature of 23° C. and a relative humidity of 50% for a duration of 100 h.

It can be seen that composition 1 according to the invention offers an excellent compromise of mechanical properties, density reduction and thermal conductivity. Moreover, the composition of the invention offers a very good compromise between reduction of thermal conductivity and the heat-distortion temperature (HDT).

Furthermore, composition 1 shows a 20% reduction in absorption of moisture relative to the conventional polyamide formulations (C1). This gives a substantial increase in dimensional stability of the articles obtained from these compositions.

The invention claimed is:

1. A thermoplastic composition comprising:
   Compound A: a thermoplastic polyamide, wherein the composition comprises from 30 wt. % to 95 wt. % of polyamide relative to the total weight of the composition,
   Compound B: a thermoplastic polymer having a lower thermal conductivity than polyamide A, wherein compound B is a styrene (co)polymer, wherein the composition comprises from 0.1 wt. % to 30 wt. % of compound B relative to the total weight of the composition,
   Compound C: one or more compatibilizers between compound A and compound B, at least one of which comprises functional groups for compatibilization with compound A,
   Compound D: hollow glass beads in an amount of, based on the total weight of the composition, from 10 wt. % to 20 wt. %, and
   Compound E: reinforcing fillers or extenders in an amount of, based on the total weight of the composition, from 1 wt. % to 60 wt. %;
   wherein the thermoplastic polyamide is a blend of polyamide 6.6 and polyamide 6 and the proportion by weight of polyamide 6 relative to the total weight of polyamide is between 1% and 30%.

2. The composition as defined in claim 1, wherein the composition has a thermal conductivity below $0.272X^2+0.088X+CtM$, wherein:
   X is a proportion by weight of reinforcing fillers or extenders E) present in the composition, and
   CtM is a thermal conductivity of a matrix M comprising polyamide A, polymer B and compound C, in the absence of any fillers.

3. The composition as defined by claim 1, wherein compound B is a styrene (co)polymer comprising a rubber on which acrylonitrile and a styrene compound are grafted.

4. The composition as defined by claim 3, wherein the styrene compound is selected from styrene or a-methylstyrene.

5. The composition as defined by claim 3, wherein the rubber of compound B is selected from the group consisting of: polybutadiene, butadiene-styrene rubber, butadiene-acrylate rubber, butadiene-acrylonitrile rubber, ethylene-propylene rubber, ethylene-propylene-diene rubber and mixtures of two or more of these rubbers.

6. The composition as defined by claim 1, wherein compound B is an acrylonitrile-butadiene-styrene copolymer, optionally comprising functions for compatibilization with the polyamide.

7. The composition as defined by claim 1, wherein compound C is selected from the group consisting of a styrene-maleimide copolymer comprising functional groups for compatibilization with the polyamide, and a styrene-ethylene-butadiene-styrene or styrene-butadiene-styrene block copolymer optionally fully or partially hydrogenated, having functional groups for compatibilization with the polyamide.

8. The composition as defined by claim 7, wherein the functional groups for compatibilization with the polyamide are selected from the group consisting of maleic anhydride, carboxylic acid, and an ester group.

9. The composition as defined by claim 1, wherein the hollow glass beads have an average diameter from 1 μm to 2 mm.

10. The composition as defined by claim 1, wherein the hollow glass beads endow said composition with a density reduction of at least 0.4% for each 1 wt. % of glass beads added to said composition.

11. The composition as defined by claim 1, wherein the glass beads provide a decrease of at least 5% of the total weight of the composition.

12. A method of manufacturing a composition as claimed in claim 1 wherein the method comprises mixing the compounds hot or cold.

13. An article obtained by forming the composition as defined in claim 1.

14. The article as defined in claim 13, wherein the article is a microcellular article.

15. The article as defined in claim 13 having an extruded profile.

16. A window or door having a frame comprising the article as defined in claim 15 having an extruded profile.

17. A thermoplastic composition comprising:
   Compound A: a thermoplastic polyamide, wherein the composition comprises 40 wt. % to 80 wt. % of polyamide relative to the total weight of the composition;
   Compound B: a thermoplastic polymer having a lower thermal conductivity than polyamide A, wherein compound B is a styrene (co)polymer and wherein the composition comprises from 1 wt. % to 20 wt. % relative to the total weight of the composition;
   Compound C: one or more compatibilizers between compound A and compound B, at least one of which comprises functional groups for compatibilization with compound A, wherein the composition comprises 0.5 wt. % to 5 wt. % of compatibilizer relative to the total weight of the composition Compound D: hollow glass beads in an amount of, based on the total weight of the composition, from 10 wt. % to 20 wt. %, and Compound E: reinforcing fillers or extenders in an amount of, based on the total weight of the composition, from 15 wt. % to 50 wt. %;

wherein the thermoplastic polyamide is a blend of polyamide 6.6 and polyamide 6 and the proportion by weight of polyamide 6 relative to the total weight of polyamide is between 1% and 30%.

18. The composition according to claim 17, wherein compound C is a styrene-maleimide copolymer comprising functional groups for compatibilization with the polyamide.

* * * * *